US012440961B2

(12) United States Patent
Itozawa et al.

(10) Patent No.: US 12,440,961 B2
(45) Date of Patent: Oct. 14, 2025

(54) ROBOT SYSTEM AND METHOD FOR DRIVING ROBOT

(71) Applicant: TOYOTA JIDOSHA KABUSHIKI KAISHA, Toyota (JP)

(72) Inventors: Yuta Itozawa, Nagoya (JP); Hirotaka Komura, Tokyo-to (JP); Kunihiro Iwamoto, Nagakute (JP); Yutaro Takagi, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/467,106

(22) Filed: Sep. 14, 2023

(65) Prior Publication Data

US 2024/0131686 A1 Apr. 25, 2024
US 2024/0227165 A9 Jul. 11, 2024

(30) Foreign Application Priority Data

Oct. 21, 2022 (JP) ................................ 2022-168791

(51) Int. Cl.
*B25J 9/00* (2006.01)
*B25J 5/00* (2006.01)
*B25J 9/10* (2006.01)
*B25J 9/16* (2006.01)

(52) U.S. Cl.
CPC ............. *B25J 9/0048* (2013.01); *B25J 5/007* (2013.01); *B25J 9/1005* (2013.01); *B25J 9/106* (2013.01); *B25J 9/162* (2013.01)

(58) Field of Classification Search
CPC ........ B25J 5/007; B25J 9/0048; B25J 9/1005; B25J 9/104; B25J 9/106; B25J 9/162; B25J 19/0008
See application file for complete search history.

(56) References Cited

U.S. PATENT DOCUMENTS

| 11,858,136 B2 * | 1/2024 | Chiba | .......................... B25J 11/00 |
| 2009/0108553 A1 * | 4/2009 | Serai | ..................... B62K 11/007 280/80.1 |
| 2021/0155410 A1 | 5/2021 | Takai et al. | |
| 2021/0388887 A1 * | 12/2021 | Hayashi | ................. B25J 9/1623 |
| 2022/0134538 A1 * | 5/2022 | Trui | .......................... B25J 9/108 74/490.01 |

(Continued)

FOREIGN PATENT DOCUMENTS

| CN | 106346489 A | * | 1/2017 | .......... B25J 11/0085 |
| CN | 111571557 B | * | 12/2020 | |

(Continued)

OTHER PUBLICATIONS

English translation of CN 106346489 A (Year: 2017).*

Primary Examiner — Joseph Brown
(74) Attorney, Agent, or Firm — Oliff PLC

(57) ABSTRACT

A robot system and a method for driving a robot capable of moving the position of the center of gravity of the robot while minimizing the increase in the footprint thereof are provided. A robot system according to an aspect of the present disclosure includes a robot. The robot includes a movable moving part, an upper body part disposed above the moving part, and a driving mechanism for tilting the upper body part and moving a lower end of the upper body part in a direction in which the upper body part is tilted.

4 Claims, 6 Drawing Sheets

(56) References Cited

U.S. PATENT DOCUMENTS

2022/0166288 A1\* 5/2022 Nose .................... H02K 7/14

FOREIGN PATENT DOCUMENTS

| JP | 2000-190879 A | 7/2000 |
| JP | 2009-241169 A | 10/2009 |
| JP | 2013-101593 A | 5/2013 |
| JP | 2015-047961 A | 3/2015 |
| JP | 2021-086198 A | 6/2021 |

\* cited by examiner

ROBOT SYSTEM AND METHOD FOR DRIVING ROBOT

CROSS REFERENCE TO RELATED APPLICATIONS

This application is based upon and claims the benefit of priority from Japanese patent application No. 2022-168791, filed on Oct. 21, 2022, the disclosure of which is incorporated herein in its entirety by reference.

BACKGROUND

The present disclosure relates to a robot system and a method for driving a robot.

Japanese Unexamined Patent Application Publication No. 2000-190879 discloses a vehicle capable of maintaining a base mount, on which an object or the like can be placed, horizontally all the time.

SUMMARY

It should be noted that in order to keep its balance, a robot sometimes tilts its upper body part. In this case, there is a problem that the footprint of the robot increases.

The present disclosure has been made in view of the above-described problem, and provides a robot system and a method for driving a robot capable of moving the position of the center of gravity of the robot while minimizing the increase in the footprint thereof.

A robot system according to an aspect of the present disclosure is a robot system including a robot, the robot including:
a movable moving part;
an upper body part disposed above the moving part; and
a driving mechanism for tilting the upper body part and moving a lower end of the upper body part in a direction in which the upper body part is tilted.

A method for driving a robot according to an aspect of the present disclosure is a method for driving a robot including a movable moving part and an upper body part disposed above the moving part, the method including tilting the upper body part and moving a lower end of the upper body part in a direction in which the upper body part is tilted.

According to the present disclosure, it is possible to provide a robot system and a method for driving a robot capable of moving the position of the center of gravity of the robot while minimizing the increase in the footprint thereof.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Specific embodiments to which the present disclosure is applied will be described hereinafter in detail with reference to the drawings. However, the present disclosure is not limited to the below-shown embodiments. Further, for clarifying the explanation, the following description and drawings are simplified as appropriate.

First Embodiment

Figure 1:
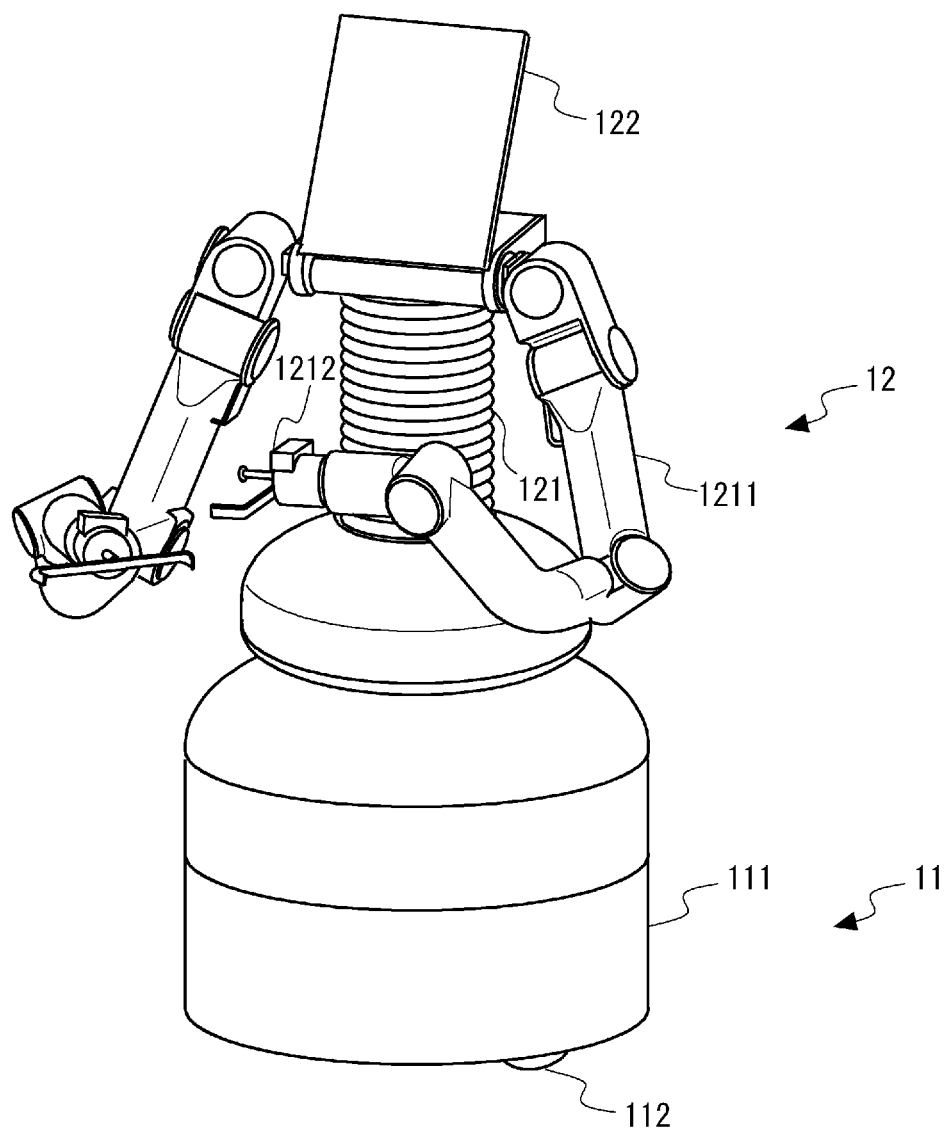
FIG. 1 is a perspective view for explaining a robot according to a first embodiment.
Figure 2:
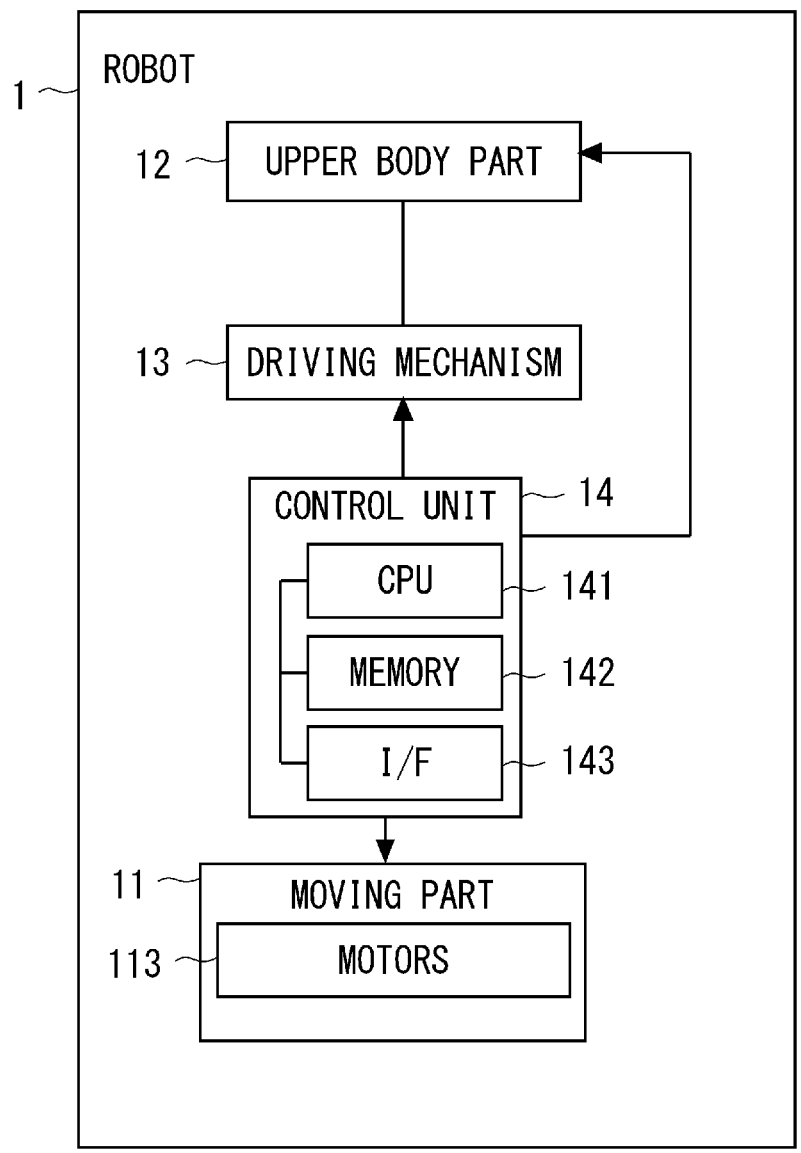
FIG. 2 is a block diagram for explaining a functional configuration of the robot according to the first embodiment.

A robot system according to a first embodiment will be described hereinafter with reference to the drawings. The robot system includes a robot 1. FIG. 1 is a perspective view for explaining an external shape of the robot 1, and FIG. 2 is a block diagram for explaining a functional configuration of the robot 1. The robot 1 may be, for example, a life assistance robot that assists, in a house, people living in the house in doing housework and the like.

The robot system according to the first embodiment may include a server (not shown) that instructs the robot 1 to operate. However, the robot system according to the first embodiment may also include a system which does not include a server and in which a robot 1 can complete a process by itself without requiring any external help.

The robot 1 includes a movable moving part 11, an upper body part 12, a driving mechanism 13, and a control unit 14. The robot 1 may include a posture sensor that detects the posture of the robot 1.

The moving part 11 includes a base 111, wheels 112, and motors 113. The wheels 112 are rotatably disposed on the underside of the base 111. The driving mechanism 13 is disposed inside the base 111. The motors 113 rotationally drive the wheels 112. The motors 113 can move the base 111 to an arbitrary place by rotating the wheels 112 according to a control signal from the control unit 14. The number of wheels 112 is arbitrarily determined. Further, the moving part 11 may include a driven wheel(s). Any configuration can be used as long as the base 111 can be moved to an arbitrary place.

The upper body part 12 is disposed above the moving part 11. The upper body part 12 may be supported from below by the driving mechanism 13. The upper body part 12 includes a body part 121 and a head part 122.

The body part 121 is driven by the driving mechanism 13. As the driving mechanism 13 tilts the body part 121, the upper body part 12 is tilted. The body part 121 may be supported from below on a support base provided in the driving mechanism 13.

The body part 121 includes arms 1211 and hands 1212 disposed at tips of the arms 1211 (i.e., at ends of the arms 1211). The arms 1211 and the hands 1212 are driven by motors (not shown) which are driven by a control signal(s) from the control unit 14, and the hands 1212 grasp various objects. The base end of the arm 1211 (i.e., each of the arms 1211) is also referred to as a shoulder.

The body part 121 may have a function of expanding or contracting in an up/down direction. The size of the robot 1 can be reduced by contracting the body part 121. By expanding the body part 121, the robot 1 can perform a task at a high place. When the expanded body part 121 is tilted, there is a high risk that the footprint of the robot 1 will increase.

The head part 122 disposed above the body part 121. Although the configuration of the head part 122 can be arbitrarily determined, the head part 122 can be equipped with a camera and/or a display panel.

The driving mechanism 13 is disposed inside or above the base 111. The driving mechanism 13 drives the upper body part 12 according to a control signal from the control unit 14. The driving mechanism 13 tilts the upper body part 12 and moves the lower end of the upper body part 12 in the direction in which the upper body part 12 is tilted. For example, the driving mechanism 13 tilts the upper body part 12 forward and moves the lower end of the upper body part 12 in the forward direction of the robot 1. As a result, the position of the center of gravity of the robot 1 moves. When the robot 1 moves on a slope, grasps an object, or undergoes acceleration, it needs to keep its balance by moving (i.e., shifting) the position of the center of gravity thereof. The robot 1 according to the first embodiment can move the position of the center of gravity of the robot 1 without widely changing the tilting angle of the upper body part 12.

A robot according to related art can move the position of the center of gravity thereof only by rotating the upper body part 12 around an axis that passes through the lower end of the upper body part 12 (hereinafter also referred to as a first rotation axis). In this case, in order to change the position of the center of gravity of the robot 1, the upper body part 12 has to be widely tilted. In contrast, since the robot 1 according to this embodiment moves the lower end of the upper body part 12 in the direction in which the upper body part 12 is tiled, the position of the center of gravity of the robot 1 can be changed without widely changing the tilting angle of the upper body part 12.

As an example of a configuration of such a driving mechanism 13 is a spherical link mechanism. The center of the spherical link mechanism is located at a position lower than the lower end (the first rotation axis) of the upper body part 12, and the upper body part 12 rotates around an axis lower than the first rotation axis. In this case, the lower end of the upper body part 12 moves in the direction in which the upper body part 12 is tilted. The center of the spherical surface of the spherical link mechanism may be located on the ground. In this case, the stability of the robot 1 can be improved. For example, when the robot 1 moves on a slope, it is possible to prevent the robot 1 from falling down by making the up/down direction of the upper body part 12 roughly parallel to the vertical direction. The number of actuators that are used when the upper body part 12 is tiled by using the spherical link mechanism is smaller than the number of actuators that are used when the upper body part 12 is tiled by using a Stewart platform.

Note that the driving mechanism 13 is not limited to the spherical link mechanism. For example, the driving mechanism 13 may rotate the upper body part 12 around the first rotation axis while translating the upper body part 12 (i.e., moving the upper body part 12 in a straight line) in the direction in which the upper body part 12 is tilted. For example, when the robot 1 moves on an uphill slope, the driving mechanism 13 may rotate the upper body part 12 so that the up/down axis of the upper body part 12 becomes roughly vertical, and then move the upper body part 12 horizontally in the tilting direction. Even in this case, the position of the center of gravity of the robot 1 can be easily changed.

The control unit 14 controls the moving part 11, the upper body part 12, and the driving mechanism 13. By transmitting a control signal to each of the motors 113 of the moving part 11, the control unit 14 controls the rotation of each of the wheels 112 and thereby can move the base 111 to an arbitrary place. By transmitting a control signal(s) to the body part 121, the control unit 14 makes the hands 1212 grasp various objects. By transmitting a control signal(s) to the body part 121, the control unit 14 makes the body part 121 expand and contract in the up/down direction. The control unit 14 may further have a function of displaying information on a display provided in the head part 122 or the like.

The control unit 14 may control the movement of the robot 1 by performing well-known control such as feedback control or robust control based on information about the rotations of the wheels 112 or the like detected by rotation sensors provided in the wheels 112. The control unit 14 may autonomously move the robot 1 by controlling the moving part 11, the upper body part 12, and the driving mechanism 13 based on information about a distance detected by a distance sensor, such as a camera provided in the robot 1 (e.g., a camera provided in the head part 122) or an ultrasonic sensor provided therein, map information or the like of an environment in which the robot 1 moves, and the like.

Further, the control unit 14 operates the driving mechanism 13 based on the output of a posture sensor or the like so that the robot 1 does not fall down. The control unit 14 controls the position of the center of gravity of the robot 1 so that it is confined within a predetermined area (e.g., an area surrounded by the contact points between the robot 1 and the ground). The control unit 14 can control the position of the center of gravity of the robot 1 by controlling the posture of the robot 1, i.e., the tilting angle of the upper body part 12.

The control unit 14 is, for example, formed by hardware including, as a main component, a microcomputer composed of, for example, a CPU (Central Processing Unit) 141 that performs control processing, control processing, arithmetic processing and the like, a memory 142 composed of a ROM (Read Only Memory) and a RAM (Random Access Memory) in which a control program, an arithmetic program and the like executed by the CPU 141 are stored, and an interface unit (I/F) 143 through which signals are input/output from/to an entity or the like disposed outside the control unit 14. The CPU 141, the memory 142, and the interface unit 143 are connected to each other through a data bus or the like.

Figure 3:
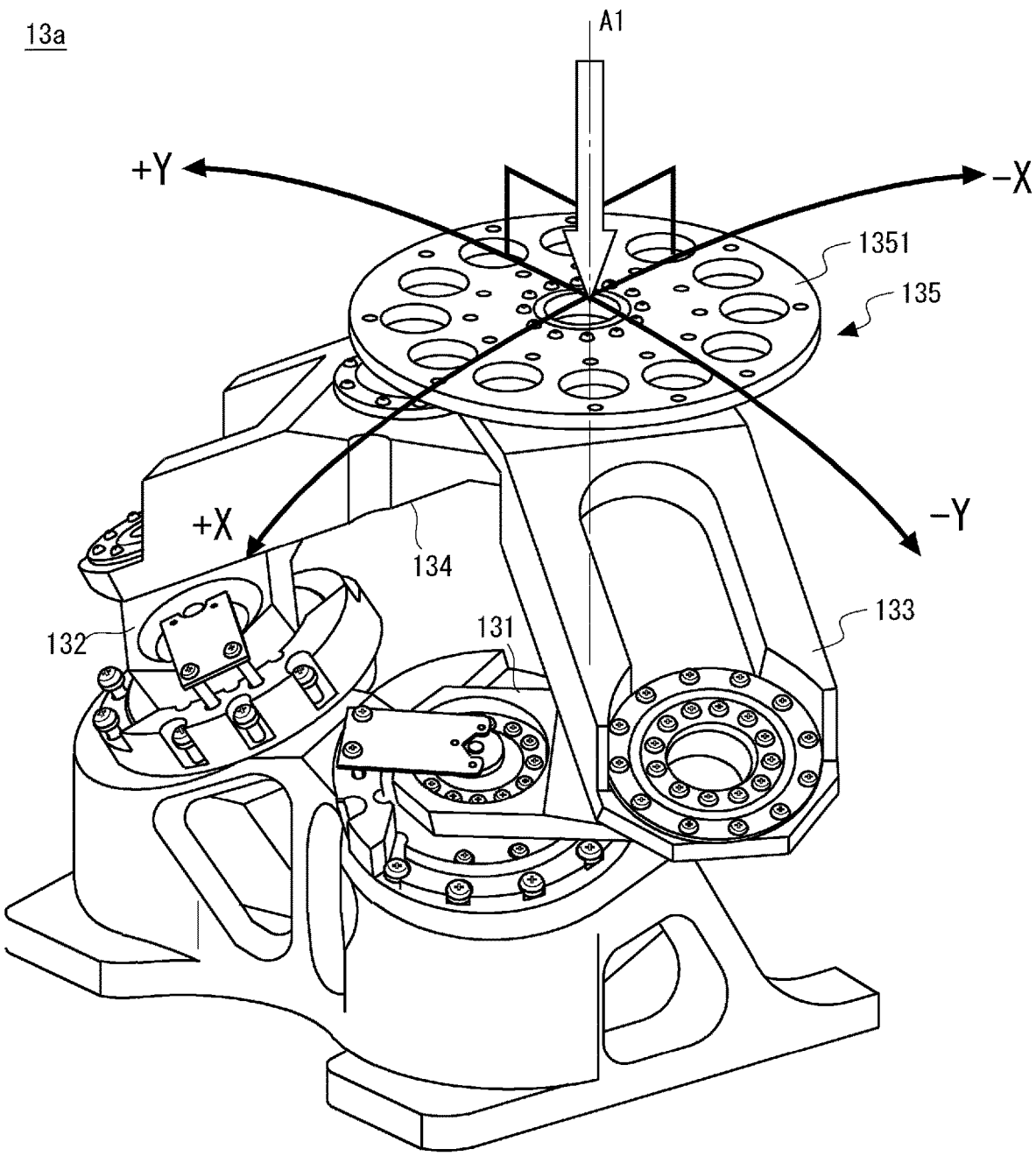
FIG. 3 is a perspective view for explaining a configuration of a spherical link mechanism according to the first embodiment.

Next, a specific example of the driving mechanism 13 will be described with reference to FIG. 3. A spherical link mechanism 13a is a specific example of the driving mechanism 13. The spherical link mechanism 13a is also referred to as a five-node spherical parallel link.

The spherical link mechanism 13a has a first link 131, a second link 132, a third link 133, a fourth link 134, and a support base 135. The support base 135 includes a support surface 1351 that supports the upper body part 12 from below. The spherical link mechanism 13a moves the support surface 1351 along the spherical surface. The support base 135 is also referred to as a mount base (or a mount table). As shown by the outlined arrow, a load corresponding to the weight of the upper body part 12 is exerted on the support surface 1351. The upper body part 12 is positioned so that its front side faces either a (+X) direction or a (−X) direction.

The first link 131, the second link 132, the third link 133, and the fourth link 134 move over the spherical surface. The first link 131, the second link 132, the third link 133, and the fourth link 134 may be formed in shapes along the spherical surface (i.e., in shapes that conform to the shape of the spherical surface).

The first link 131 is rotated, for example, in clockwise and counter-clockwise directions through a shaft or the like around the rotation center provided on the base end side. The second link 132 is also rotated, for example, in clockwise and counter-clockwise directions through a shaft or the like around the rotation center provided on the base end side.

The base end of the third link 133 is connected to the tip of the first link 131 as a rotating pair. The third link 133 may be disposed over the first link 131. The base end of the fourth link 134 is connected to the tip of the second link 132 as a rotating pair. The fourth link 134 may be disposed over the second link 132. The third and fourth links 133 and 134 are also referred to as a pair of links.

The tips of the third and fourth links 133 and 134 are connected to each other as a rotating pair. The support base 135 is rotatably fixed to the connecting part between the third and fourth links 133 and 134 around a rotation axis A1 perpendicular to the support surface 1351. The rotation axis A1 may be the axis of the rotation pair of the third and fourth links 133 and 134. The support base 135 is rotated so that the orientation of the upper body part 12 as viewed from above becomes an intermediate orientation between the orientations of the third and fourth links 133 and 134. Note that the orientation of a link may be a direction from the tip of the link to the base end thereof, or may be a direction from the base end of the link to the tip thereof. When the orientation of the link is a direction from the tip of the link to the base end thereof, the upper body part 12 faces in the (+X) direction, whereas when the orientation of the link is a direction from the base end to the tip, the upper body part 12 faces in the (−X) direction.

When the first link 131 rotates clockwise and the second link 132 rotates counter-clockwise, the upper body part 12 tilts in the (+X) direction. When the first link 131 rotates counter-clockwise and the second link 132 rotates clockwise, the upper body part 12 tilts in the (−X) direction. When the first link 131 rotates clockwise and the second link 132 rotates clockwise, the upper body part 12 tilts in the (−Y) direction. When the first link 131 rotates counter-clockwise and the second link 132 rotates counter-clockwise, the upper body part 12 tilts in the (+Y) direction.

Next, the reason why the support base 135 is rotated will be described. One of conceivable methods for moving the support surface 1351 along the spherical surface is to fix the support base 135 to the third link 133 or the fourth link 134. When the support base 135 is fixed to the third link 133, the orientation of the upper body part 12 with respect to the third link 133 is fixed, so there is a problem that when the upper body part 12 is tilted in the (+X) or (−X) direction, i.e., when upper body part 12 is tilted forward or backward, the orientation of the upper body part 12 as viewed from above changes. When the upper body part 12 facing forward is tilted forward or backward, the orientation of the upper body part 12 is deviated from the forward direction to the left or to the right. This situation is inconvenient because, for example, the orientations of the shoulders of the upper body part 12 are also changed. A similar problem occurs when the support base 135 is fixed to the fourth link 134.

The support base 135 is rotated so that the orientation of the upper body part 12 tilted in the (+X) or (−X) direction does not change. Specifically, the rotation speed of the support base 135 relative to the third link 133 is reduced to a half of the rotation speed of the fourth link 134 relative to the third link 133. The rotational speed of the support base 135 relative to the fourth link 134 may be reduced to a half of the rotational speed of the third link 133 relative to the fourth link 134.

Figure 4:
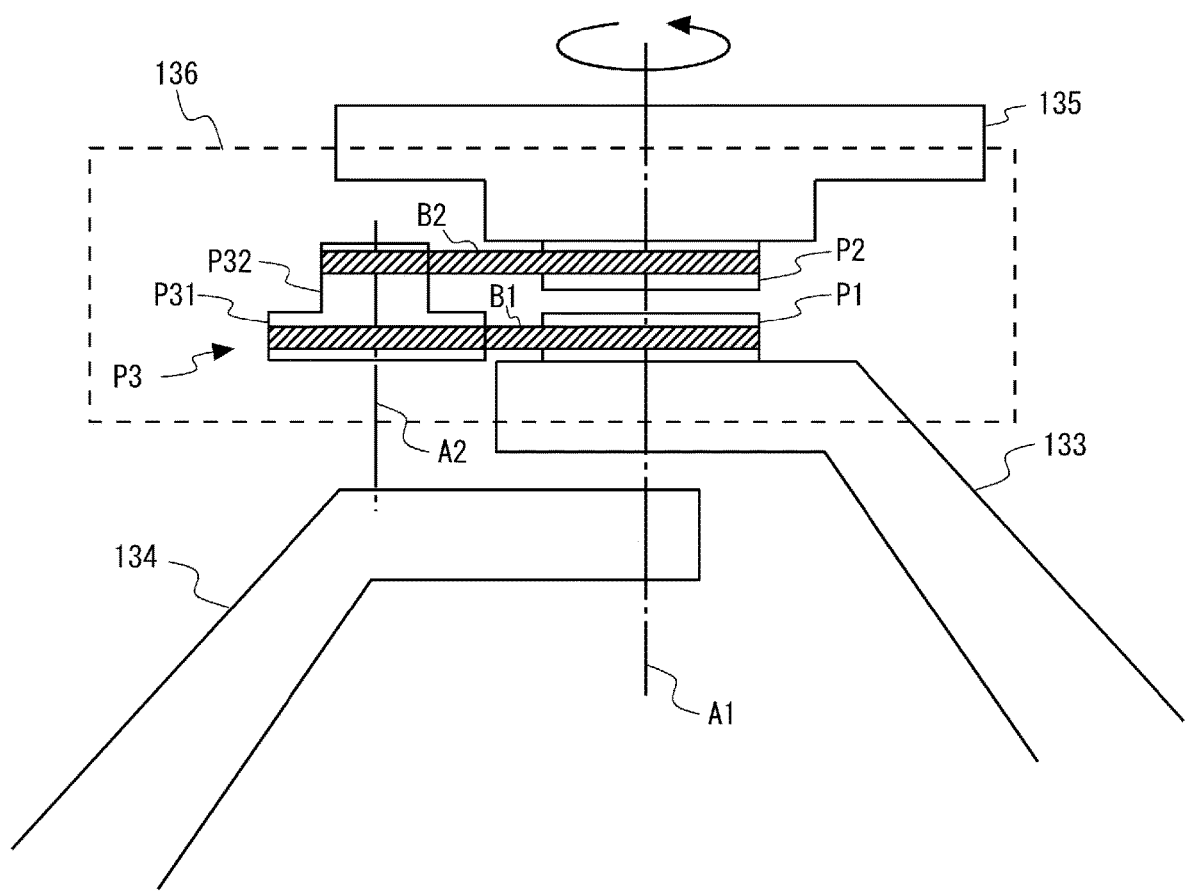
FIG. 4 is a front view for explaining a configuration of a reduction gear according to the first embodiment.

FIG. 4 is a front view for explaining an example of a configuration of a speed reducer 136 that lowers the rotational speed of the support base 135. The speed reducer 136 includes a pulley P1, a pulley P2, and a two-stage pulley P3. The tips of the third and fourth links 133 and 134 are connected to each other as a rotating pair. The support base 135 is rotatably fixed around a rotation axis A1. The pulley P1, which rotates around the rotation axis A1, is fixed on the third link 133. Further, the pulley P2, which rotates around the rotation axis A1, is fixed on the underside of the support base 135.

The two-stage pulley P3 is rotatably fixed around a rotation axis A2. The rotation axis A2 is provided in such a manner that it passes through a point on the fourth link 134 and is parallel to the rotation axis A1. The two-stage pulley P3 includes a pulley P31 disposed at the lower stage and a pulley P32 disposed at the upper stage. The diameter of the pulley P31 is a half of that of the pulley P32. The rotation of the pulley P1 is transmitted to the pulley P31 through a belt B1. The rotation of the pulley P32 is transmitted to the pulley P2 through a belt B2.

The pulley P3 rotates according to the rotation speed of the fourth link 134 relative to the third link 133. Since the diameter of the pulley P32 is a half of the diameter of the pulley P31, the pulley P3 rotates the support base 135 at a rotation speed that is a half of the rotation speed of the fourth link 134.

Note that the configuration of the speed reducer 136 is not limited to the configuration shown in FIG. 4. The positions of the third and fourth links 133 and 134 may be reversed. Gears may be used in place of the pulleys.

Figure 5:
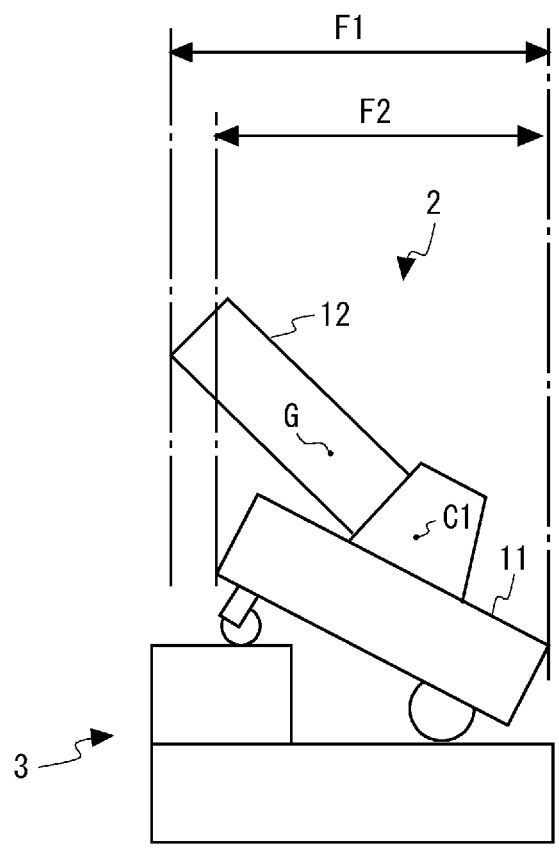
FIG. 5 is a diagram for explaining a movement of a robot according to related art.

Next, advantageous effects of the first embodiment will be described with reference to FIGS. 5 and 6. FIG. 5 is a diagram for explaining a method by which a robot 2 according to related art moves on an uphill slope 3. When the robot 2 moves on the uphill slope 3, it is necessary to move the center of gravity G of the upper body part 12 forward in order to prevent the robot 2 from falling over. The robot 2 rotates the upper body part 12 around a rotation axis C1 that passes through the lower end of the upper body part 12. When the forward tilting angle is large, the overall footprint F1 of the robot 2 increases, thus raising a risk that the footprint F1 will become larger than the footprint F2 of the moving part 11.

Figure 6:
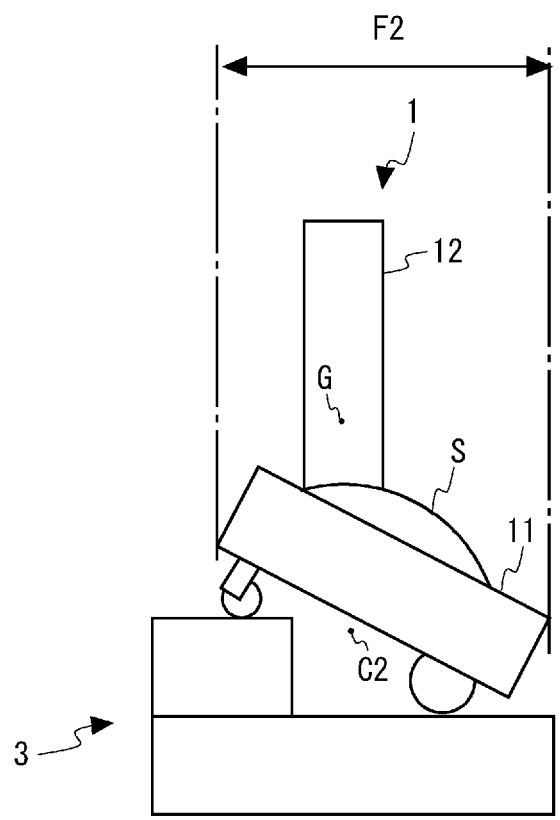
FIG. 6 is a diagram for explaining a movement of a robot according to the first embodiment.

FIG. 6 is a diagram for explaining a method by which the robot 1 according to the first embodiment moves on an uphill slope 3. The robot tilts the upper body part 12 forward around the center C2 of the spherical surface that is located at a position lower than the rotation axis C1. The symbol S represents the spherical surface centered at the center C2 of the spherical surface. Since the lower end of the upper body part 12 also moves forward, the forward tilting angle of the upper body part 12 may be smaller than that shown in FIG. 5. For example, by just driving the upper body part 12 so that the up/down direction of the upper body part 12 becomes roughly vertical, it is possible to prevent the robot 1 from falling down. In this case, the overall footprint of the robot 1 is the footprint F2 of the moving part 11. According to the first embodiment, the position of the center of gravity of the robot can be moved without widely tilting the upper body part 12. Therefore, it is possible to move the position of the center of gravity of the robot while minimizing the increase in the footprint thereof.

Note that, as already described above, the robot 1 needs to keep balance not only when its moves on a slope, but also when it grasps an object or it undergoes acceleration. According to the first embodiment, it is possible to easily make the robot 1 operate in a narrow environment such as in a home.

Further, according to the first embodiment, since the tilting angle of the upper body part 12 can be reduced, the output of the actuator that is required to keep the balance of the robot 1 can be reduced.

Note that the present disclosure is not limited to the above-described embodiments, and they can be changed as appropriate without departing from the scope and spirit of the disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A robot system comprising a robot, the robot comprising:
   a movable moving part;
   an upper body part disposed above the moving part; and
   a driving mechanism for tilting the upper body part and moving a lower end of the upper body part in a direction in which the upper body part is tilted, the driving mechanism being a spherical link mechanism for moving a support surface supporting the upper body part from below along a spherical surface, wherein:
   the spherical link mechanism includes a pair of links,
   a first link of the pair of links has (i) a first base end mounted for rotation about a first rotational center of the first base end and (ii) a tip end,
   a second link of the pair of links has (i) a second base end mounted for rotation about a second rotational center of the second base end, the second base end being rotatably connected to the tip end of the first link,
   the spherical link mechanism includes a support base including the support surface, the support base being rotatably connected to a connecting part connected to the second link, wherein
   the connecting part is a speed reducer configured to lower a rotational speed of the support base relative to the second link of the pair of links to a half of a rotation speed of a third link of another pair of links relative to the second link.

2. The robot system according to claim 1, wherein the upper body part is configured to expand and contract in an up/down direction.

3. The robot system according to claim 1, wherein when the robot moves on an uphill slope, the driving mechanism drives the upper body part so that an up/down direction of the upper body part becomes vertical.

4. The robot system according to claim 1, wherein the connecting part is separate from the support base and the second link.

* * * * *